United States Patent Office 3,120,440
Patented Feb. 4, 1964

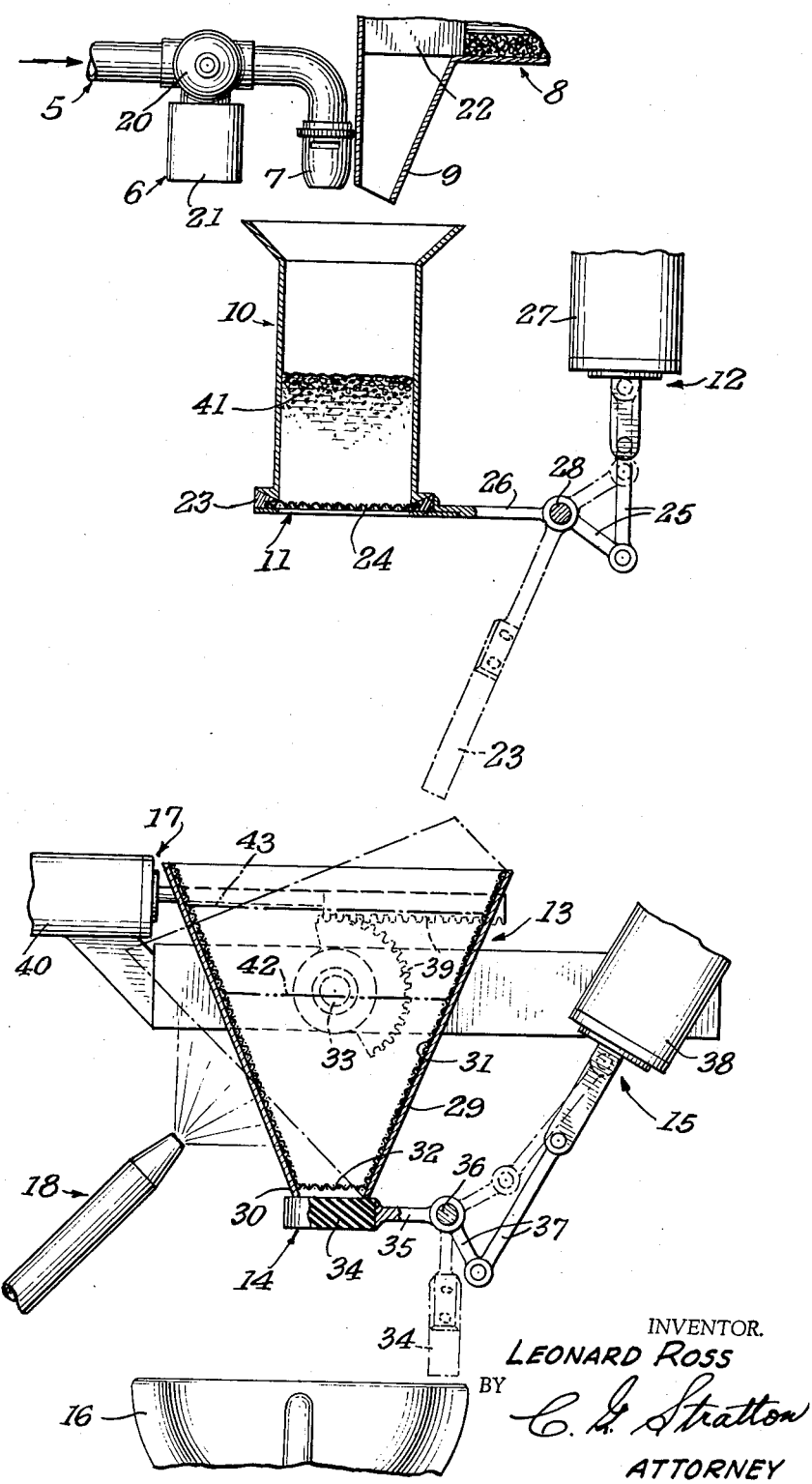

3,120,440
METHOD FOR BREWING AND DISPENSING COFFEE
Leonard Ross, 5944 Aldea Ave., Encino, Calif.
Filed Aug. 6, 1962, Ser. No. 215,180
6 Claims. (Cl. 99—71)

This invention relates to a method and apparatus for brewing and dispensing coffee or similar beverages.

An object of the invention is to provide a brewing method that brews coffee and the like in two successive stages utilizing two batches of coffee grounds, the method entailing a brewing stage using one batch of coffee grounds and a subsequent wash-through stage using a fresh batch of coffee, thereby effecting full and aromatic brewing before dispensing of the brew.

Another object of the invention is to provide a method as above contemplated in which the batch of coffee grounds used for the initial brew is cleansed or flushed away and is replaced by the wash-through batch while the latter is replaced by a fresh batch of ground coffee. Thus, the method contemplates the dispensing of successive, uniform amounts of brewed coffee during the above-indicated replacement of successive batches of grounds.

This invention also has for its objects to provide a novel, economical and convenient method or process of superior utility, and to provide apparatus to carry out said process and that is positive in operation, convenient in use, easily installed in working position and easily disconnected therefrom, economical of manufacture, relatively simple, and of general superiority and serviceability.

The invention also contemplates novel combinations of method steps as well as novel details of construction and novel combinations and arrangements of parts, which will appear more fully in the course of the following description, which is based on the accompanying drawing. However, said drawing merely shows, and the following description merely describes, the invention with respect to a preferred method and apparatus, the same, nevertheless, being given by way of illustration or example only.

The figure is a semi-schematic view of apparatus according to the present invention and for carrying out the method thereof.

The apparatus that is illustrated comprises, generally, a source of hot water 5, a controller 6 for flow of said water through an outlet nozzle 7, a storage for ground coffee 8 provided with a discharge chute 9 adjacent to the nozzle 7, a container 10 having an open bottom and receptive of water from nozzle 7 and ground coffee from the chute 9, a foraminous closure 11 for said container, means 12 to move said closure between closed and open positions, a bottom-open brewer 13 directly beneath the container 10 to receive discharge from the latter of hot wash-through water and moistened grounds from the container 10, as the case may be, a valve 14 to close the bottom of the brewer, means 15 to operate said valve between closed and open positions to control discharge of brewed coffee from the brewer 13 into a receptacle, such as a cup 16, means 17 to move the receptacle 13 to clean-out position, and a flushing means 18 for washing out the residual coffee grounds for disposal, as into a drain.

The controller 6 for hot water flow is shown as a valve 20 and an actuating solenoid 21 that may be push-button controlled.

The coffee storage 8 may be provided with a measuring or metering gate or valve 22 that, by reciprocation or oscillation, deposits uniform batches of ground coffee into the container 10 through the chute 9.

The valve or closure 11 is shown with a frame 23 that closes around the lower rim of container 10, and a screen or similar water-passing member 24 spanning across the open bottom of said container. The interstices of the member 24 are such as to preclude passage therethrough of coffee grounds. Such fine powdered grounds that may pass therethrough will enter the brewer 13 and have inconsequential effect on the operation of the device.

The means 12 is shown as linkage 25 connected to an arm 26 that carries the foraminous member 24, and a solenoid 27 to operate said linkage to move the closure 11 between closed and open positions, as shown, on a pivot 28.

The brewer 13 is shown as a conical vessel 29 normally disposed with its larger end up and having a lower, smaller discharge end 30. Said vessel is preferably directly beneath the container 10 and is receptive of discharge from said container. The brewer further comprises a foraminous liner 31 that is provided with a bottom wall 32, said liner, therefore, constituting a grounds-holding means which passes liquid from the grounds through the wall 32 and outward of the discharge end 30 of the vessel 29. In this instance, the brewer is carried on a pivot 33 and is rotational on said pivot between an upright brewing and coffee-discharging position and a rotated clean-out position, approximately 135° from the upright position.

The valve 14 comprises a preferably liquid-impervious, resilient member 34 that normally closes the vessel end 30, as shown, the same being carried by an arm 35 for movement on a pivot 36 between closed and open positions.

The means 15 is shown as linkage 37, and a solenoid 38 the latter, through said linkage, moving the valve 14 between open and closed position, as desired.

The means 17 is shown as a rack and segment device 39 that, under control of a solenoid 40, rotates the brewer in the manner hereinbefore indicated.

It will be realized that the various solenoids and the means controlled thereby are merely examples of means for controlling the operation of the components of the apparatus, and that other suitable means may be employed, as desired. Whatever control means is used, the same may be manually operated in desired sequence or be automatically or semi-automatically operated, as desired.

Operation

The present brewing cycle starts with a batch of pre-moistened coffee grounds 41 in the container 10. Such grounds may remain in the container as long as twenty-four hours, or even longer, depending on conditions. In any case, a brewing cycle ends with the moistened grounds 41 in container 10.

When a quantity of coffee is to be brewed, for instance a cupful, the controller 6 is operated to open the hot water flow to discharge a predetermined amount of water into said container 10. In order to obtain a wash-out of the grounds 41, the foraminous closure is simultaneously opened. Thus, the grounds 41 together with fresh hot water are deposited in the brewer 13. In practice, approximately half a cup, as measured by the receptacle 16, is used for this initial supply of water, although more may be used, as desired. In this manner, the brewer 13 is provided with a quantity of coffee grounds and hot water to an approximate level 42 and the same is left to brew or steep for a desired time period at least long enough to allow for closing of the closure 11 and subsequent deposit of a fresh batch of grounds into the container 10. In immediate sequence, the controller is again operated to open the hot water supply 5 and discharge from a quarter to a half cup of additional hot water into the container 10. This additional water will wash through the grounds in said container pre-moistening the same and simultaneously extracting flavor from said grounds, pass through the foraminous closure 11, and commingle with the contents of the brewer to raise the level 42 to the level 43.

The brewing time may be continued for as long a period as desired before the valve 14 is opened to allow the freshly brewed coffee to pass through the wall 32 and enter the receptacle 16, the same being ready to be served and consumed.

At this time, the brewer is turned by the means 17 to its clean-out position and the flushing means 18 used for cleaning all the grounds from the inverted brewer. Upon return of the brewer to upright position, the above-described brewing and cleaning cycle may be repeated.

The terms "coffee" and "grounds" above and in the following claims are intended to include coffee substitutes as well as grounds substitutes, and also other hot potable liquids and the materials from which the same are brewed or extracted.

While the foregoing illustrates and describes what is now contemplated to be the best mode of carrying out the invention with respect to both the method and apparatus, the same is, of course, subject to modification without departing from the spirit and scope of the invention. Therefore, it is not desired to restrict the invention to the particular method steps or combination or sequence of steps described, nor to the particular form of construction illustrated and described, but to cover all equivalents or modifications of method and apparatus that may fall within the scope of the appended claims.

Having thus described the invention, what is claimed and desired to be secured by Letters Patent is:

1. A method for brewing and dispensing a receptacle full of coffee beverage that consists in
    (a) holding a quantity sufficient to brew a receptacle full of coffee beverage of pre-moistened coffee grounds in a bottom-open container, retaining said moistened coffee grounds in the container while allowing the moistening water to pass through the container,
    (b) adding an additional amount of hot water to said container to the moistened grounds and substantially simultaneously releasing the grounds and the hot water therein into a brewing vessel,
    (c) re-filling said container with a fresh quantity of coffee grounds while the material in the brewing vessel is steeping,
    (d) directing an additional amount of hot water through said fresh grounds and into the contents of the brewing vessel,
    (e) after allowing said contents of the brewing vessel to steep further, dispensing the liquid thereof into a receptacle, and finally
    (f) cleaning out the grounds residual in the brewing receptacle.

2. A method according to claim 1 in which substantially the same amounts of hot water are used for adding to the moistened coffee grounds and for moistening the fresh grounds.

3. A method according to claim 1 in which between one-quarter and one-half of the total amount of water used is used for adding to the moistened coffee grounds in the bottom-open container.

4. In a method for brewing and dispensing a receptacle full of coffee beverage the step of
    (a) providing a charge of water-borne ground coffee in an upper receptacle during the steeping period of a similar charge of water-borne coffee to which additional water had been added and while steeping take place in a lower brewing receptacle,
    (b) dispensing the coffee solution formed in said brewing receptacle as a beverage into a receptacle, and
    (c) Flushing out the brewing receptacle.

5. In a method for brewing and dispensing a receptacle full of coffee beverage; the steps of
    (a) gravitationally discharging a quantity of water-borne ground coffee from an upper container into a lower brewing container while the latter container is closed at its bottom,
    (b) steeping the water-borne ground coffee in said brewing container until the same becomes converted into a grounds-contained coffee solution,
    (c) re-filling the upper receptacle with a new charge of water-borne ground coffee during the steeping period above mentioned,
    (d) first dispensing the coffee solution as a beverage into a receptacle, and
    (e) then flushing out the brewing receptacle.

6. In a method according to claim 4, the step of adding additional water to the ground coffee in the upper receptacle prior to flushing out the brewing container.

References Cited in the file of this patent

UNITED STATES PATENTS

| | | |
|---|---|---|
| 1,551,855 | Svendsgaard | Sept. 1, 1925 |
| 1,665,728 | Canright | Apr. 10, 1928 |
| 1,687,112 | Slocum et al. | Oct. 9, 1928 |
| 2,155,971 | Houseman | Apr. 25, 1939 |
| 2,392,452 | Baumann | Jan. 8, 1946 |
| 2,403,691 | States | July 9, 1946 |
| 2,750,870 | Colonna | June 19, 1956 |
| 3,085,496 | Reynolds | Apr. 16, 1963 |